United States Patent
Yu

(10) Patent No.: US 11,953,975 B2
(45) Date of Patent: Apr. 9, 2024

(54) PERIPHERAL COMPONENT INTERCONNECT EXPRESS DEVICE ERROR REPORTING OPTIMIZATION METHOD AND SYSTEM CAPABLE OF FILTERING ERROR REPORTING MESSAGES

(71) Applicant: Wiwynn Corporation, New Taipei (TW)

(72) Inventor: Chi-Feng Yu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 8 days.

(21) Appl. No.: 17/987,872

(22) Filed: Nov. 16, 2022

(65) Prior Publication Data
US 2024/0054040 A1    Feb. 15, 2024

(30) Foreign Application Priority Data
Aug. 15, 2022   (TW) .................................. 111130637

(51) Int. Cl.
G06F 11/07    (2006.01)
G06F 11/32    (2006.01)
G06F 13/40    (2006.01)

(52) U.S. Cl.
CPC ...... *G06F 11/0772* (2013.01); *G06F 11/0781* (2013.01); *G06F 11/327* (2013.01); *G06F 13/409* (2013.01)

(58) Field of Classification Search
CPC ............. G06F 11/0772; G06F 11/0781; G06F 11/327; G06F 13/049
USPC ......................................... 714/44, 45, 48, 57
See application file for complete search history.

(56) References Cited

U.S. PATENT DOCUMENTS

| | | | |
|---|---|---|---|
| 11,868,174 B2 * | 1/2024 | Gaide ..................... | H01L 24/02 |
| 2009/0292960 A1 * | 11/2009 | Haraden ............. | G06F 11/0745 714/699 |
| 2013/0060987 A1 * | 3/2013 | Bolen ..................... | G06F 13/00 710/316 |
| 2016/0196194 A1 * | 7/2016 | Shih ...................... | G06F 11/221 714/43 |
| 2016/0283305 A1 * | 9/2016 | Kugata ............... | G06F 11/0706 |
| 2017/0102985 A1 * | 4/2017 | Song ..................... | G06F 11/079 |

FOREIGN PATENT DOCUMENTS

| | | | | |
|---|---|---|---|---|
| CN | 106502814 A | * | 3/2017 | .......... G06F 11/0787 |
| CN | 109947585 A | * | 6/2019 | |
| CN | 110457164 A | * | 11/2019 | |

(Continued)

*Primary Examiner* — Chae M Ko
(74) *Attorney, Agent, or Firm* — Winston Hsu

(57) ABSTRACT

A peripheral component interconnect express (PCIe) device error reporting optimization method includes acquiring advanced error reporting data of a PCIe device, executing a removal detection process of the PCIe device for detecting if the PCIe device is plugged into a connector, transmitting error log data of the PCIe device to a baseboard management controller and an advanced configuration and power interface according to the advanced error reporting data if the PCIe device is plugged into the connector, and filtering the error log data of the PCIe device so that filtered error log data is received by the baseboard management controller and the advanced configuration and power interface if the PCIe device and the connector are electrically disconnected.

20 Claims, 3 Drawing Sheets

(56) References Cited

FOREIGN PATENT DOCUMENTS

| CN | 111722965 | A | * | 9/2020 | ............ G06F 11/221 |
| CN | 114138606 | A |   | 3/2022 | |
| CN | 114265731 | A |   | 4/2022 | |
| CN | 217787754 | U | * | 11/2022 | |

* cited by examiner

PERIPHERAL COMPONENT INTERCONNECT EXPRESS DEVICE ERROR REPORTING OPTIMIZATION METHOD AND SYSTEM CAPABLE OF FILTERING ERROR REPORTING MESSAGES

BACKGROUND OF THE INVENTION

1. Field of the Invention

The present invention illustrates a peripheral component interconnect express device error reporting optimization method and system, and more particularly, a peripheral component interconnect express device error reporting optimization method and system capable of filtering error reporting messages.

2. Description of the Prior Art

When an error occurs in a peripheral component interconnect express (PCIe) device, error reporting messages displayed on an operation interface only include error log data types of the PCIe device. However, since the operation interface lacks displaying error triggering events corresponding to the error log date of the PCIe device, the debugging effort and debugging complexity for engineers are undoubtedly increased.

SUMMARY OF THE INVENTION

In an embodiment of the present invention, a peripheral component interconnect express (PCIe) device error reporting optimization method is disclosed. The PCIe device error reporting optimization method comprises acquiring advanced error reporting (AER) data of a PCIe device, executing a removal detection process of the PCIe device for detecting if the PCIe device is plugged into a connector, transmitting error log data of the PCIe device to a baseboard management controller (BMC) and an advanced configuration and power interface (ACPI) according to the AER data if the PCIe device is plugged into the connector, and filtering the error log data of the PCIe device so that filtered error log data is received by the BMC and the ACPI if the PCIe device and the connector are electrically disconnected.

In another embodiment of the present invention, a PCIe device error reporting optimization system is disclosed. The PCIe device error reporting optimization system comprises a PCIe device, a connector, a processor, a BMC, and an ACPI. The processor is coupled to the connector and configured to execute a basic input/output system (BIOS) and execute a removal detection process. The BMC is coupled to the processor and configured to receive error log data or filtered error log data processed by the processor. The ACPI is coupled to the processor and configured to receive the error log data or the filtered error log data processed by the processor. The processor acquires AER data of the PCIe device. The processor executes the removal detection process of the PCIe device for detecting if the PCIe device is plugged into the connector. The processor transmits error log data of the PCIe device to the BMC and the ACPI according to the AER data if the PCIe device is plugged into the connector. The processor filters the error log data of the PCIe device so that the filtered error log data is received by the BMC and the ACPI if the PCIe device and the connector are electrically disconnected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
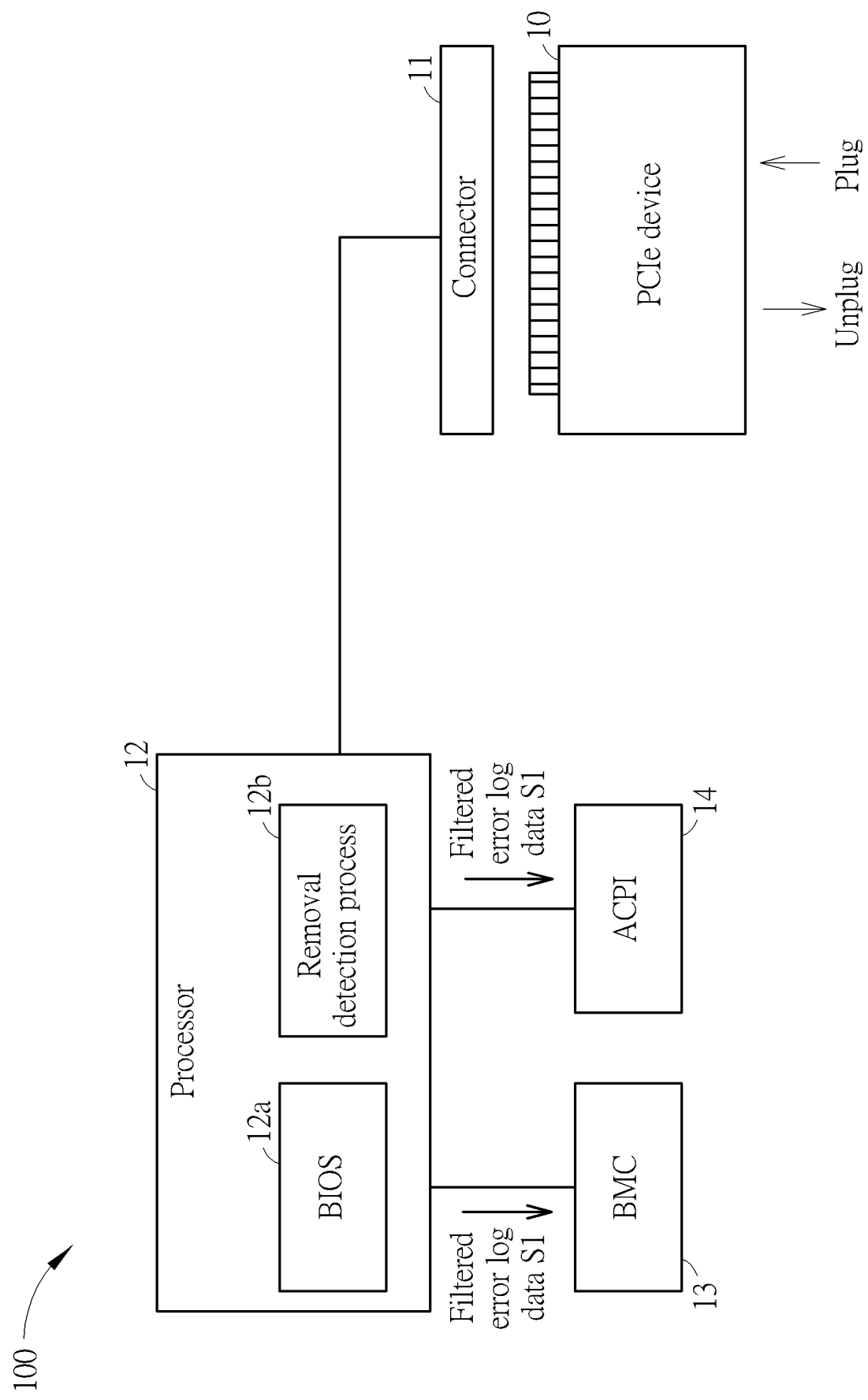
FIG. 1 is a block diagram of a peripheral component interconnect express (PCIe) device error reporting optimization system according to an embodiment of the present invention.

FIG. 1 is a block diagram of a peripheral component interconnect express (PCIe) device error reporting optimization system 100 according to an embodiment of the present invention. The PCIe device error reporting optimization system 100 includes a PCIe device 10, a connector 11, a processor 12, a baseboard management controller (BMC) 13, and an advanced configuration and power interface (ACPI) 14. The PCIe device 10 can be a graphics card, a hard disk, a solid-state disk, or a network card, but is not limited thereto. In other embodiments, the connector 11 can be used for linking with the PCIe device 10. The PCIe device 10 can be electrically coupled to the connector 11 or electrically disconnected from the connector 11 by using a hot-plugged mechanism. The processor 12 is coupled to the connector 11 for executing a basic input/output system (BIOS) 12a and executing a removal detection process 12b. The processor 12 can be a central processing unit (CPU). When the connector 11 is connected to the PCIe device 10, the processor 12 can communicate with the PCIe device 10. The BMC 13 is coupled to the processor 12 for receiving error log data or filtered error log data 51 processed by the processor 12. The ACPI 14 is coupled to the processor 12 for receiving the error log data or the filtered error log data 51 processed by the processor 12.

In the PCIe device error reporting optimization system 100, the processor 12 can also acquire advanced error reporting (AER) data of the PCIe device 10. The AER data can include correctable error data and uncorrectable error data. Here, when the PCIe device 10 and the connector 11 are electrically disconnected, an error log data of the PCIe device 10 corresponds to a part of correctable error data of unplugging the PCIe device 10 from the connector 11. Further, after the PCIe device 10 is unplugged from the connector 11, the processor 12 can execute a system management interrupt (SMI) process. After the SMI process is executed, the processor 12 can acquire the AER data of the PCIe device 10. According to the AER data, an operation interface can display error reporting messages including the correctable error data exclusive of an error triggering event corresponding to unplugging the PCIe device 10 from the connector 11.

In some cases, the processor 12 can mask the error log data corresponding to specific error conditions. However, once a masking mechanism is enabled, not only is the error log data corresponding to the specific error conditions masked, but the error log data corresponding to remaining error conditions are also masked. Therefore, no error log data can be received by the BMC 13 and the ACPI 14. Since each error condition corresponds to a status, although masking all error log data can reduce debugging complexity for engineers, statuses corresponding to the specific error conditions are hard to be determined due to no masked error log data is displayed on an operation interface used for displaying error reporting messages. Additionally, it is hard to merely eliminate the error log data corresponding to the specific error conditions while transmitting residue error log data to the BMC 13 and the ACPI 14. Therefore, the error reporting operation adopts limited applications and lacks flexibility and convenience.

In the present invention, error log data corresponding to specific error triggering events can be filtered out according to actual applications and design requirements. In other words, error log data corresponding to other error triggering events can still be received by the BMC 13 and the ACPI 14. Therefore, the PCIe device error reporting optimization system 100 can reduce debugging complexity for engineers since the operation interface used for displaying error reporting messages is only used for displaying error log data corresponding to other error triggering events. For example, when the error log data of the PCIe device 10 corresponds to the correctable error data of unplugging the PCIe device 10 from the connector 11, the error log data can be filtered out. Accordingly, the processor 12 can be configured to determine if an error triggering event of the error log data corresponds to electrically disconnecting the PCIe device 10 from the connector 11. In the PCIe device error reporting optimization system 100, the removal detection process 12b can be introduced. By doing so, after the processor 12 acquires the AER data, the processor 12 can execute the removal detection process 12b of the PCIe device 10 for detecting if the PCIe device 10 is plugged into the connector 11.

Further, when the PCIe device 10 generates error log data and the processor 12 determines that the PCIe device 10 is plugged into the connector 11 (i.e., the PCIe device 10 is electrically coupled to the connector 11), it implies that the error log data is irrelevant to an error triggering event of electrically disconnecting the PCIe device 10 from the connector 11. Therefore, no correctable error data of unplugging the PCIe device 10 from the connector 11 is introduced to the error log data of the PCIe device 10. The processor 12 can transmit the error log data of the PCIe device 10 to the BMC 13 and the ACPI 14 according to the AER data for reporting errors to engineers. When the PCIe device 10 generates error log data and the processor 12 determines that the PCIe device 10 and the connector 11 are electrically disconnected, it implies that the error log data is relevant to the error triggering event of electrically disconnecting the PCIe device 10 from the connector 11. Therefore, the correctable error data of unplugging the PCIe device 10 from the connector 11 is introduced to the error log data of the PCIe device 10. The processor 12 can filter the error log data so that the BMC 13 and the ACPI 14 can receive the filtered error log data Sl. By doing so, since only the correctable error data of unplugging the PCIe device 10 from the connector 11 is filtered out by the processor 12, only the correctable error data of unplugging the PCIe device 10 from the connector 11 cannot be received by the BMC 13 and the ACPI 14. It cannot be reported to the engineers. The residue correctable error data (i.e., the filtered error log data Si) can still be received by the BMC 13 and the ACPI 14. In other words, only the part of correctable error data of unplugging the PCIe device 10 from the connector 11 is filtered out from the correctable error data. The residue correctable error data (without an unplugging error event) is received by the BMC 13 and the ACPI 14. The operation interface can display error reporting massages of the residue correctable error data for reporting errors to engineers. Therefore, the PCIe device error reporting optimization system 100 can reduce debugging complexity for engineers without missing error reporting messages of the residue correctable error data, thereby capable of applying various applications with high flexibility and convenience.

Figure 2:
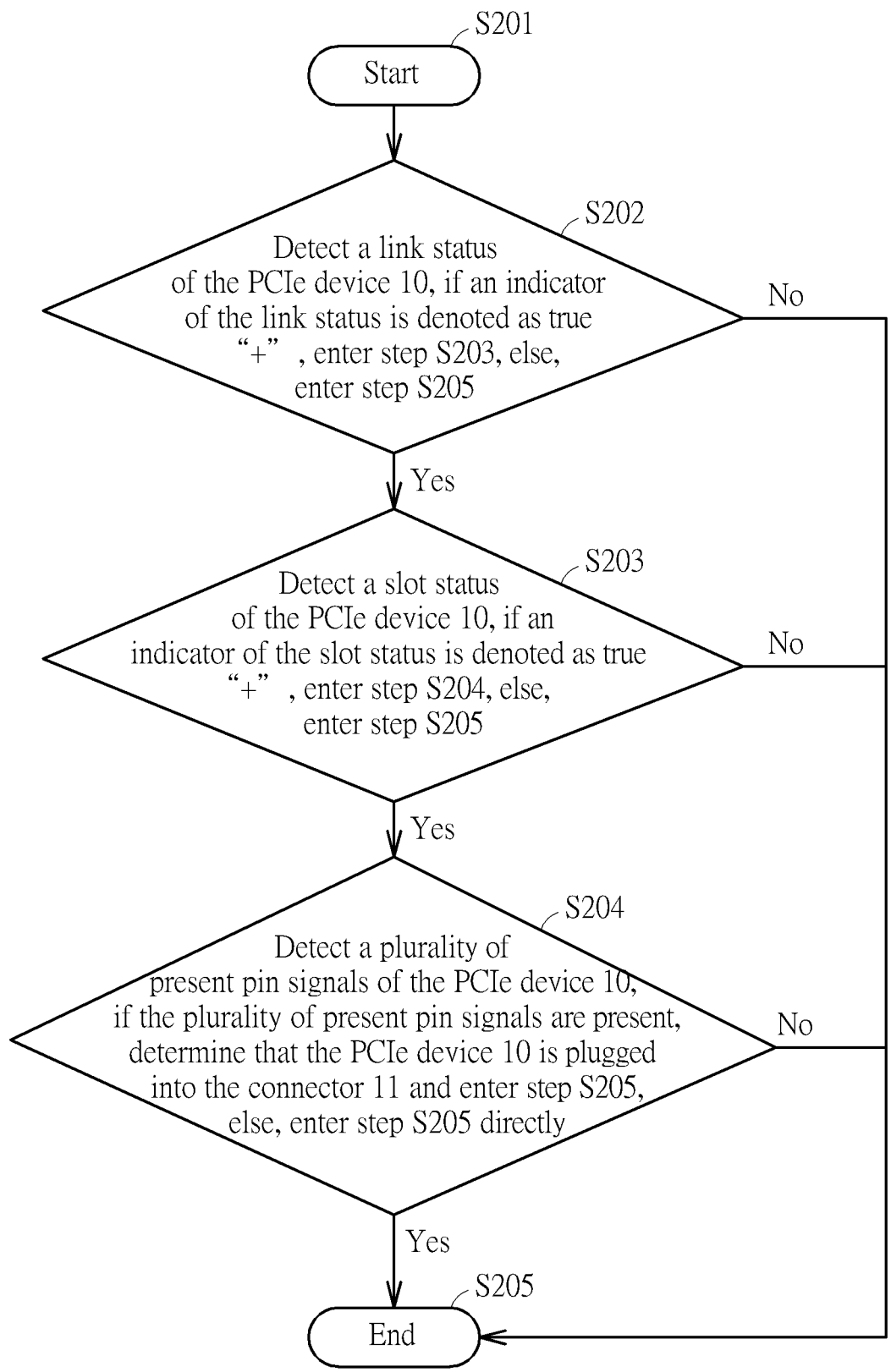
FIG. 2 is a flowchart of executing a removal detection process by the PCIe device error reporting optimization system in FIG. 1.

FIG. 2 is a flow chart of executing the removal detection process 12b by the PCIe device error reporting optimization system 100. The removal detection process 12b can include but not limited to step S201 to step S205. The order of steps S201 to S205 is not limited to the following step order. Any technology or hardware modification of the step S201 to step S205 falls into the scope of the present invention. Step S201 to step S205 are illustrated below.

step S201: start;
step S202: detect a link status of the PCIe device 10, if an indicator of the link status is denoted as true "+", enter step S203, else, enter step S205;
step S203: detect a slot status of the PCIe device 10, if an indicator of the slot status is denoted as true "+", enter step S204, else, enter step S205;
step S204: detect a plurality of present pin signals of the PCIe device 10, if the plurality of present pin signals are present, determine that the PCIe device 10 is plugged into the connector 11 and enter step S205, else, enter step S205 directly;
step S205: end.

In step S202 to step S204, detection results of the link status, the slot status, and the plurality of present pin signals can be used for determining if the PCIe device 10 is plugged into the connector 11. However, in other embodiments, at least one detection result can be used for determining if the PCIe device 10 is plugged into the connector 11. Here, when the PCIe device 10 is plugged into the connector 11, the indicators are denoted as true "+" in step S202 and step S203. When the processor 12 determines that the PCIe device 10 is plugged into the connector 11, it implies that the error log data is irrelevant to the error triggering event of electrically disconnecting the PCIe device 10 from the connector 11. Therefore, no correctable error data of unplugging the PCIe device 10 from the connector 11 is introduced to the error log data of the PCIe device 10. Conversely, when the processor 12 determines that the PCIe device 10 and the connector 11 are electrically disconnected, it implies that the error log data is relevant to the error triggering event of electrically disconnecting the PCIe device 10 from the connector 11. Therefore, the correctable error data of unplugging the PCIe device 10 from the connector 11 is introduced to the error log data of the PCIe device 10. The processor 12 can filter out the correctable error data of unplugging the PCIe device 10 from the connector 11. In other embodiments, if the BMC 13 is coupled to the PCIe device 10, in step S204, the BIOS 12a can read the plurality of present pin signals through the BMC 13. Then, the processor 12 can determine if the PCIe device 10 is plugged into the connector 11 according to the plurality of present pin signals. Alternatively, if a general-purpose input/output (GPIO) device is coupled to the PCIe device 10, in step S204, the BIOS 12a can read the plurality of present pin signals through the GPIO device. Similarly, the processor 12 can determine if the PCIe device 10 is plugged into the connector 11 according to the plurality of present pin signals.

Figure 3:
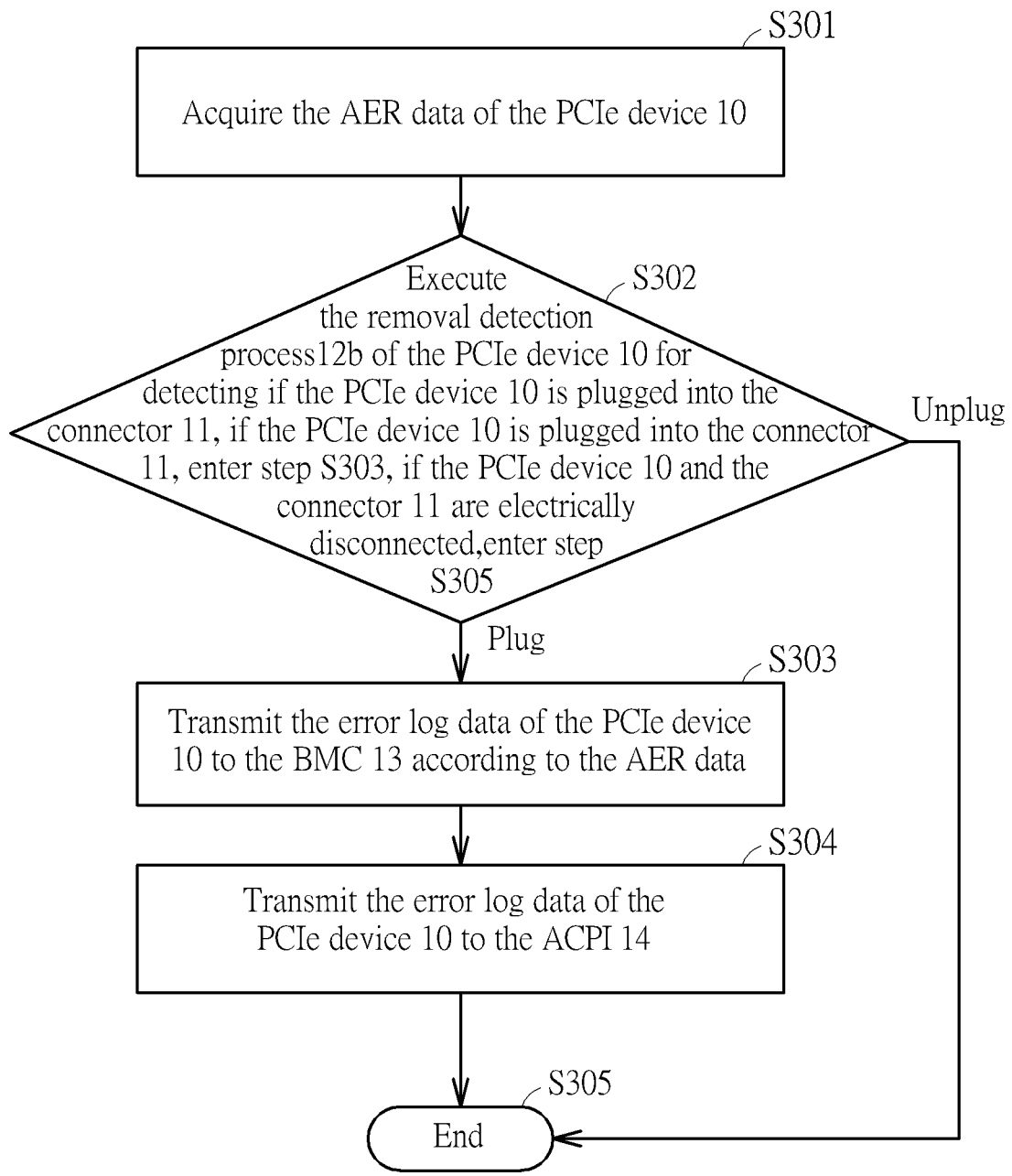
FIG. 3 is a flow chart of executing a PCIe device error reporting optimization method by the PCIe device error reporting optimization system in FIG. 1.

FIG. 3 is a flow chart of executing a PCIe device error reporting optimization method by the PCIe device error reporting optimization system 100. The PCIe device error reporting optimization method can include but not limited to step S301 to step S305. The order of steps S301 to S305 is not limited to the following step order. For example, step S303 and step S304 can be exchanged. Any technology or hardware modification of the step S301 to step S305 falls into the scope of the present invention. Step S301 to step S305 are illustrated below.

step S301: acquire the AER data of the PCIe device 10;

step S302: execute the removal detection process 12b of the PCIe device 10 for detecting if the PCIe device 10 is plugged into the connector 11, if the PCIe device 10 is plugged into the connector 11, enter step S303, if the PCIe device 10 and the connector 11 are electrically disconnected, enter step S305;

step S303: transmit the error log data of the PCIe device 10 to the BMC 13 according to the AER data;

step S304: transmit the error log data of the PCIe device 10 to the ACPI 14;

step S305: end.

In step S301, the AER data of the PCIe device 10 can be acquired. As previously mentioned, after the PCIe device 10 is unplugged from the connector 11, the processor 12 can execute the SMI process. After the SMI process is executed, the processor 12 can acquire the AER data of the PCIe device 10. According to the AER data, the operation interface can display error reporting messages including the correctable error data exclusive of an error triggering event corresponding to unplugging the PCIe device 10 from the connector 11. In order to determine if the error triggering event of the error log data corresponds to electrically disconnecting the PCIe device 10 from the connector 11, in step S302, the processor 12 can execute the removal detection process 12b of the PCIe device 10 for detecting if the PCIe device 10 is plugged into the connector 11. When the PCIe device 10 is plugged into the connector 11, it implies that the error log data is irrelevant to the error triggering event of electrically disconnecting the PCIe device 10 from the connector 11. Therefore, no correctable error data of unplugging the PCIe device 10 from the connector 11 is introduced to the error log data of the PCIe device 10. Then, step S303 and step S304 are executed for transmitting the error log data of the PCIe device 10 to the BMC 13 and ACPI 14 for reporting errors to engineers. When the PCIe device 10 and the connector 11 are electrically disconnected, it implies that the error log data is relevant to the error triggering event of electrically disconnecting the PCIe device 10 from the connector 11. That is, the correctable error data of unplugging the PCIe device 10 from the connector 11 is introduced to the error log data of the PCIe device 10. Accordingly, the correctable error data of unplugging the PCIe device 10 from the connector 11 can be filtered out. Therefore, such correctable error data is not transmitted to the BMC 13 and ACPI 14 in step S303 and step S304. In other words, when the error triggering event of the error log data corresponds to electrical disconnections between the PCIe device 10 and the connector 11, the processor 12 can filter out this error log data. The residue correctable error data (i.e., the filtered error log data Si) can still be received by the BMC 13 and the ACPI 14 for reporting errors to engineers.

To sum up, the present invention discloses a PCIe device error reporting optimization method and a PCIe device error reporting optimization system. A purpose of the PCIe device error reporting optimization system is to filter error log data corresponding to specific error triggering events. For example, when the PCIe device is unplugged from the connector, the error log data of the unplugging error event can be filtered out. By doing so, the PCIe device error reporting optimization system can reduce debugging complexity for engineers without missing error reporting information of the residue correctable error data, thereby capable of applying various applications with high flexibility and convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A peripheral component interconnect express (PCIe) device error reporting optimization method comprising:
    acquiring advanced error reporting data of a PCIe device;
    executing a removal detection process of the PCIe device for detecting if the PCIe device is plugged into a connector;
    transmitting error log data of the PCIe device to a baseboard management controller and an advanced configuration and power interface according to the advanced error reporting data if the PCIe device is plugged into the connector; and
    filtering the error log data of the PCIe device so that filtered error log data is received by the baseboard management controller and the advanced configuration and power interface if the PCIe device and the connector are electrically disconnected.

2. The method of claim 1, further comprising:
    providing the PCIe device and the connector;
    executing a system management interrupt (SMI) process after the PCIe device is unplugged from the connector; and
    acquiring the advanced error reporting data of the PCIe device after the SMI process is performed.

3. The method of claim 1, wherein executing the removal detection process of the PCIe device comprises:
    detecting a link status of the PCIe device; and
    determining if the PCIe device is plugged into the connector according to the link status.

4. The method of claim 1, wherein executing the removal detection process of the PCIe device comprises:
    detecting a slot status of the PCIe device; and
    determining if the PCIe device is plugged into the connector according to the slot status.

5. The method of claim 1, wherein executing the removal detection process of the PCIe device comprises:
    detecting a plurality of present pin signals of the PCIe device; and
    determining if the PCIe device is plugged into the connector according to the plurality of present pin signals.

6. The method of claim 5, further comprising:
    reading the plurality of present pin signals by a basic input/output system (BIOS) through the baseboard management controller if the baseboard management controller is coupled to the PCIe device.

7. The method of claim 5, further comprising:
    reading the plurality of present pin signals by a basic input/output system (BIOS) through a general-purpose input/output (GPIO) device if the GPIO device is coupled to the PCIe device.

8. The method of claim 1, wherein the advanced error reporting data comprises correctable error data and uncorrectable error data, and when the PCIe device and the connector are electrically disconnected, the error log data of the PCIe device corresponds to a part of correctable error data of unplugging the PCIe device from the connector.

9. The method of claim 8, where only the part of correctable error data of unplugging the PCIe device from the connector is filtered out from the correctable error data, and residue correctable error data is received by the baseboard management controller and the advanced configuration and power interface.

10. The method of claim 9, further comprising:
displaying error reporting massages of the residue correctable error data on an operation interface.

11. A peripheral component interconnect express (PCIe) device error reporting optimization system comprising:
a PCIe device;
a connector;
a processor coupled to the connector and configured to execute a basic input/output system (BIOS) and execute a removal detection process;
a baseboard management controller coupled to the processor and configured to receive error log data or filtered error log data processed by the processor; and
an advanced configuration and power interface coupled to the processor and configured to receive the error log data or the filtered error log data processed by the processor;
wherein the processor acquires advanced error reporting data of the PCIe device, the processor executes the removal detection process of the PCIe device for detecting if the PCIe device is plugged into the connector, the processor transmits the error log data of the PCIe device to the baseboard management controller and the advanced configuration and power interface according to the advanced error reporting data if the PCIe device is plugged into the connector, and the processor filters the error log data of the PCIe device so that the filtered error log data is received by the baseboard management controller and the advanced configuration and power interface if the PCIe device and the connector are electrically disconnected.

12. The system of claim 11, wherein the processor executes a system management interrupt (SMI) process after the PCIe device is unplugged from the connector, and the processor acquires the advanced error reporting data of the PCIe device after the SMI process is executed.

13. The system of claim 11, wherein the processor detects a link status of the PCIe device, and the processor determines if the PCIe device is plugged into the connector according to the link status.

14. The system of claim 11, wherein the processor detects a slot status of the PCIe device, and the processor determines if the PCIe device is plugged into the connector according to the slot status.

15. The system of claim 11, wherein the processor detects a plurality of present pin signals of the PCIe device, and the processor determines if the PCIe device is plugged into the connector according to the plurality of present pin signals.

16. The system of claim 15, wherein the BIOS reads the plurality of present pin signals through the baseboard management controller if the baseboard management controller is coupled to the PCIe device.

17. The system of claim 15, wherein the BIOS reads the plurality of present pin signals through a general-purpose input/output (GPIO) device if the GPIO device is coupled to the PCIe device.

18. The system of claim 11, wherein the advanced error reporting data comprises correctable error data and uncorrectable error data, and when the PCIe device and the connector are electrically disconnected, the error log data of the PCIe device corresponds to a part of correctable error data of unplugging the PCIe device from the connector.

19. The system of claim 18, where only the part of correctable error data of unplugging the PCIe device from the connector is filtered out from the correctable error data, and residue correctable error data is received by the baseboard management controller and the advanced configuration and power interface.

20. The system of claim 19, wherein an operation interface displays error reporting massages of the residue correctable error data.

* * * * *